US010198612B1

United States Patent
Hsu

(10) Patent No.: US 10,198,612 B1
(45) Date of Patent: Feb. 5, 2019

(54) SYSTEM AND METHOD FOR SCALING BIOMETRIC IMAGES

(71) Applicant: MorphoTrust USA, LLC, Billerica, MA (US)

(72) Inventor: Rein-Lien Hsu, Edison, NJ (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 15/223,309

(22) Filed: Jul. 29, 2016

Related U.S. Application Data

(60) Provisional application No. 62/198,250, filed on Jul. 29, 2015.

(51) Int. Cl.
*G06K 9/00* (2006.01)
*G06K 9/40* (2006.01)
*G06K 9/60* (2006.01)
*G06K 9/46* (2006.01)
*G06T 7/00* (2017.01)
*G06T 3/00* (2006.01)
*G06T 3/40* (2006.01)

(52) U.S. Cl.
CPC ........... *G06K 9/0008* (2013.01); *G06K 9/001* (2013.01); *G06K 9/46* (2013.01); *G06T 3/0093* (2013.01); *G06T 3/40* (2013.01); *G06T 7/0042* (2013.01); *G06T 7/0081* (2013.01); *G06K 2009/4666* (2013.01); *G06T 2207/20021* (2013.01)

(58) Field of Classification Search
USPC ................................. 382/119, 124, 275, 308
See application file for complete search history.

(56) References Cited

U.S. PATENT DOCUMENTS

| 6,466,686 B2 * | 10/2002 | Senior ................ G06K 9/00067 382/124 |
| 8,059,858 B2 * | 11/2011 | Brundage ............. G06T 1/0071 283/74 |
| 8,818,034 B2 * | 8/2014 | Zhang ................ G06K 9/00221 340/5.52 |

(Continued)

OTHER PUBLICATIONS

Ren et al., "Framework of Fingerprint Scaling," TELKOMNIKA, vol. 11, No. 3, Mar. 2013, pp. 1547-1559.

*Primary Examiner* — Kathleen Y Dulaney
(74) *Attorney, Agent, or Firm* — Fish & Richardson P.C.

(57) ABSTRACT

A method includes: normalizing intensities at each pixel in a fingerprint slap scan image such that variations of pixel intensities between fingerprint ridges and valleys are regularized; subsequently dividing the fingerprint slap scan image into blocks of pixels; for each block of pixels, estimating a spatial separation between adjacent fingerprint ridges as well as a ridge orientation for each fingerprint ridge within the particular block of pixels; calculating a distortion map for the various blocks by projecting, according to the estimated ridge orientation for each fingerprint ridge, an adjustment to the estimated spatial separation that is based on a difference between the estimated spatial separation and a target spatial separation; and warping the fingerprint slap scan image to compensate for the calculated distortion map such that the fingerprint ridges in the warped fingerprint slap scan image are scaled to compensate for local variations of adjustments in the calculated distortion map.

18 Claims, 7 Drawing Sheets

(56) References Cited

U.S. PATENT DOCUMENTS

| | | | | |
|---|---|---|---|---|
| 2003/0133143 A1* | 7/2003 | McClurg | ............ | G06K 9/00013 358/1.14 |
| 2005/0025344 A1* | 2/2005 | Zyzdryn | ................ | G06K 9/036 382/112 |
| 2005/0069179 A1* | 3/2005 | Hwang | ................ | G06K 9/0008 382/124 |
| 2007/0242858 A1* | 10/2007 | Aradhye | ............ | G06K 9/00362 382/115 |
| 2012/0057764 A1* | 3/2012 | Hara | ................. | G06K 9/00093 382/125 |

* cited by examiner

SYSTEM AND METHOD FOR SCALING BIOMETRIC IMAGES

CROSS REFERENCE TO RELATED APPLICATIONS

This application claims the benefit of priority under 35 U.S.C. § 119(e) of U.S. Provisional Application No. 62/198,250, filed on Jul. 29, 2015, and entitled "System and Method for Scaling Biometric Images," which is incorporated herein by reference in its entirety.

TECHNICAL FIELD

This document generally relates processing of biometric images such as finger prints.

BACKGROUND

Biometric images such as fingerprints are routinely captured from human subjects for identity verification.

SUMMARY

In one aspect, some implementations provide a method that includes: accessing data encoding a fingerprint slap scan image, the fingerprint slap scan image comprising pixels that represent fingerprints from fingers of a subject, each fingerprint from a particular finger including fingerprint ridges; normalizing intensities at each pixel in the fingerprint slap scan image such that variations of pixel intensities between fingerprint ridges and valleys are regularized; subsequently dividing the fingerprint slap scan image into blocks of pixels, each block of pixels including more than one fingerprint ridges; for each block of pixels, estimating a spatial separation between adjacent fingerprint ridges as well as a ridge orientation for each fingerprint ridge within the particular block of pixels; calculating a distortion map for the various blocks by projecting, according to the estimated ridge orientation for each fingerprint ridge, an adjustment to the estimated spatial separation that is based on a difference between the estimated spatial separation and a target spatial separation; and warping the fingerprint slap scan image to compensate for the calculated distortion map such that the fingerprint ridges in the warped fingerprint slap scan image are scaled to compensate for local variations of adjustments in the calculated distortion map.

Implementations may include one or more of the following features. In some implementations, warping the distortion map may include propagating the projected adjustments in the calculated distortion map for the various blocks by integrating the calculated distortion map from a warping center on the fingerprint slap scan image.

In these implementations, warping the distortion map may further include: remapping the fingerprint slap scan image onto a new grid that compensates for the calculated distortion map, the new grid being matching the projected adjustments propagated in the calculated distortion map. Warping the distortion map may further include identifying the warping center as a block that includes a fingerprint ridge with a turning curvature higher than turning curvatures of other fingerprint ridges on the fingerprint slap scan image.

Integrating the estimated spatial separation from the warping center may be performed initially along a first direction and then along a second direction, wherein the second direction is substantially orthogonal to the first direction. Integrating the estimated spatial separation from the warping center may be initially performed along a direction that is substantially horizontal in the fingerprint slap scan image and then vertically along another direction that is substantially vertical in the fingerprint slap scan image. Integrating the estimated spatial separation from the warping center is initially performed along a direction that is substantially vertical in the fingerprint slap scan image and then along another direction that is substantially horizontal in the fingerprint slap scan image.

Some implementations may further include comparing scaled fingerprint ridges on the warped fingerprint slap scan image with unscaled fingerprint ridges on a new fingerprint slap image to determine whether both fingerprint slap scan images are from the same subject. The fingerprint slap scan images and the new fingerprint slap scan images may be taken more than 1 year apart.

Each block may include N by N pixels while the pixels of the fingerprint slap scan image may be presented on a dots per inch (DPI) grid. In these configurations, N is 24 and the DPI grid is 500 dpi. Each block overlaps with a neighboring block by N/2 pixels.

Implementations may further include smoothening the noises on the fingerprint slap scan image. In these implementations, the smoothing of noise comprises blending a first output from a band-passed Log-Ratio enhancement filtering and a second output from a model-based Short-Time-Fourier-Transform enhancement processing.

The target spatial separation may be identical across all blocks.

In another aspect, some implementations provide a computer system, comprising at least one processor configured to: access data encoding a fingerprint slap scan image, the fingerprint slap scan image comprising pixels that represent fingerprints from fingers of a subject, each fingerprint from a particular finger including fingerprint ridges; normalize intensities at each pixel in the fingerprint slap scan image such that variations of pixel intensities between fingerprint ridges and valleys are regularized; subsequently divide the fingerprint slap scan image into blocks of pixels, each block of pixels including more than one fingerprint ridges; for each block of pixels, estimate a spatial separation between adjacent fingerprint ridges as well as a ridge orientation for each fingerprint ridge within the particular block of pixels; calculate a distortion map for the various blocks by projecting, according to the estimated ridge orientation for each fingerprint ridge, an adjustment to the estimated spatial separation that is based on a difference between the estimated spatial separation and a target spatial separation; and warp the fingerprint slap scan image to compensate for the calculated distortion map such that the fingerprint ridges in the warped fingerprint slap scan image are scaled to compensate for local variations of adjustments in the calculated distortion map.

The processor may be further configured to warp the distortion map by propagating the projected adjustments in the calculated distortion map for the various blocks by integrating the calculated distortion map from a warping center on the fingerprint slap scan image. The processor may be further configured to warp the distortion map by remapping the fingerprint slap scan image onto a new grid that compensates for the calculated distortion map, the new grid being matching the projected adjustments propagated in the calculated distortion map. The processor may be further configured to identify the warping center as a block that includes a fingerprint ridge with a turning curvature higher than turning curvatures of other fingerprint ridges on the fingerprint slap scan image.

In yet another aspect, some implementations provide a non-transitory machine-readable medium, comprising software instructions that, when executed by a computer processor, causes the computer processor to: access data encoding a fingerprint slap scan image, the fingerprint slap scan image comprising pixels that represent fingerprints from fingers of a subject, each fingerprint from a particular finger including fingerprint ridges; normalize intensities at each pixel in the fingerprint slap scan image such that variations of pixel intensities between fingerprint ridges and valleys are regularized; subsequently divide the fingerprint slap scan image into blocks of pixels, each block of pixels including more than one fingerprint ridges; for each block of pixels, estimate a spatial separation between adjacent fingerprint ridges as well as a ridge orientation for each fingerprint ridge within the particular block of pixels; calculating a distortion map for the various blocks by projecting, according to the estimated ridge orientation for each fingerprint ridge, an adjustment to the estimated spatial separation that is based on a difference between the estimated spatial separation and a target spatial separation; and warp the fingerprint slap scan image to compensate for the calculated distortion map such that the fingerprint ridges in the warped fingerprint slap scan image are scaled to compensate for local variations of adjustments in the calculated distortion map.

Implementations of the above techniques include a method, computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Applications of biometric identification usually face limitations such as variations caused by age differences. In the case of fingerprint identification system and methods, young children, such as infants, toddlers, or teens) often have a smaller inter-ridge distance than adults, even though the fingerprint images come from the same individual subjects. When fingerprint slap scan images from young children are compared with fingerprint slap scan images from adults, such variations in inter-ridge distances may require additional processing. To match fingerprints from various age groups and to compensate for the sensor variability among different scanning devices, a fingerprint normalization may become necessary to regularize the fingerprint features that are age dependent, for example, ridge distance, ridge distortions, ridge intensity and clarity.

The disclosure focuses on system and method to compensate for variations in biometric features caused by difference in age, rather than differences between individual subjects. For example, inter-ridge separations in fingerprint images from the same individual but at different ages may vary. Naive scaling may not be sufficient to account for age variations that are spatially dependent. In this aspect, implementations disclosed herein can compensate for inter-ridge separations caused by age variations, which may manifest as spatially variant differences.

Figure 1A:
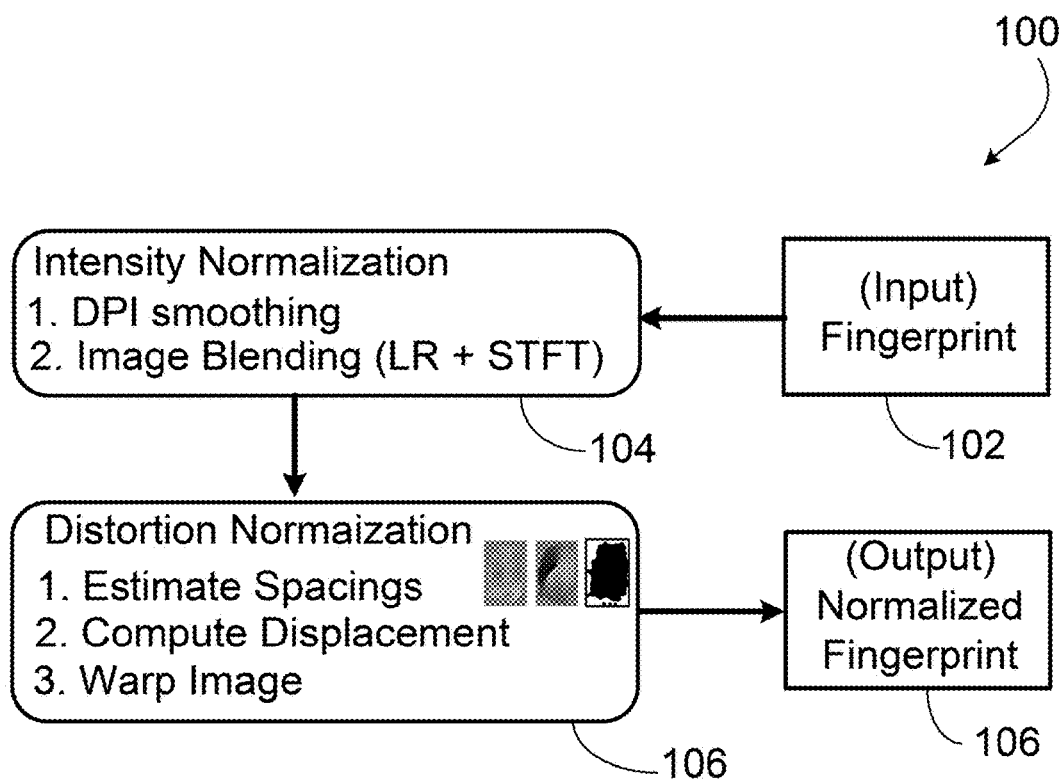
FIG. 1A is a diagram showing an example of processing an input fingerprint slap scan image to generate a normalized output fingerprint slap scan image.

FIG. 1A is a diagram 100 showing an example of processing an input fingerprint slap scan image to generate a normalized output fingerprint slap scan image. Initially, an input fingerprint slap scan image 102 is obtained. The fingerprint slap scan image 102 may be obtained from a fingerprint slap scanner device, or a data storage device. The scanner device may include an optical fingerprint imaging device for capturing a digital image of the print using visible light. Such an optical scanner device may be a camera device that includes a touch surface for placing a finger, a light-emitting phosphor layer which illuminates the surface of the finger. The light reflected from the finger passes through the phosphor layer to an array of solid state pixels (e.g., a charge-coupled device (CCD)) which captures an optical image of the fingerprint. The scanner device may also include ultrasonic sensors such as piezoelectric transducers in obtaining fingerprint images. Some implementations may include capacitance sensors where sensor array pixels each act as one plate of a parallel-plate capacitor, the dermal layer (which is electrically conductive) acts as the other plate, and the non-conductive epidermal layer acts as a dielectric.

Intensity normalization may then be performed on fingerprint slap scan image 102. Some implementations may include a dot-per-inch (DPI) smoothing when changing the scale from an initial DPI sampling density to a later (e.g., lower) DPI and a smoothing process that reduces the noise (e.g., manifest as pores on the ridges) by blending two types of information—a band-passed Log-Ratio enhancement and a model-based Short-Time Fourier-Transform enhancement. The band-passed Log-Ratio enhancement information refers to the texture information along the ridges on the fingerprint image after the image has been processed by several band-pass filters that focus on particular frequency band of signals (covering possible ridge frequencies) on a log intensity scale. The Short-Time Fourier-Transform (STFT) enhancement information refers to the output from a localized and spectrally modified image by virtue of a sliding window of STFT. This short-time Fourier transform (STFT) is a windowed Fourier transform. In some implementations, a 2D Fourier transform may be performed within each block and the dominate frequency component is selected for the reconstruction of ridge signal. In this way the reconstructed block may substantially suppress non-fingerprint ridge texture signals/patterns. Intensity normalization thus reduce intensity variations caused by locale dependencies. Such variations may be created by, for example, less than uniform illumination from lighting sources during image capture, non-uniform manner in which a fingertip is laid out on the touch surface, non-uniform sensitivity on the sensor (e.g., charge-coupled devices (CCD)). Here, the log-ratio approach in the spatial domain and a short-time-Fourier-transform approach in the frequency domain may create a clear fingerprint that would not resemble the over-filtered Gabor-based enhancement.

Thereafter, the intensity normalized image undergoes distortion normalization (106). This distortion normalization process may locally estimates displacement and then locally warp fingerprint data so that the ridge distortions can be substantially reduced.

Distortion normalization may include spacing estimation which estimates local ridge spacings via STFT and ridge splines to generate block-wise ridge spacing estimates. Initially, the images are divided into block sizes of 24×24 at 500 DPI. The estimation algorithm via STFT or ridge spline may process the normalized fingerprint block by block with an overlap of, e.g., half a block. The estimation algorithm may then use a 12-pixel interval for adjacent block processing due to the overlapping blocks used. Over low quality, core, and delta areas, the estimation may include special treatment. For example, coverage of ridges in these areas may be examined and secondary spatial frequency characterizing the covered ridges may be calculated as well.

Distortion normalization 106 may include a distortion estimation component which calculates/models localized distortion maps for fingerprints. This distortion estimation component calculates displacement of, for example, ridges in fingerprint. Based on the calculated displacement maps, integrations can be performed from the center of the fingerprint image where the curvatures of the ridges tend to be the greatest. The direction of integration can be horizontally and/or vertically.

Distortion normalization 106 may further include a correction-or-restoration component. This component may implement an image warping algorithm to deform the intensity-normalized fingerprint image to compensate for the calculated distortion maps according to the integrated displacement. The resultant fingerprint image 108 may contain ridges with a desired ridge distance.

Figure 1B:
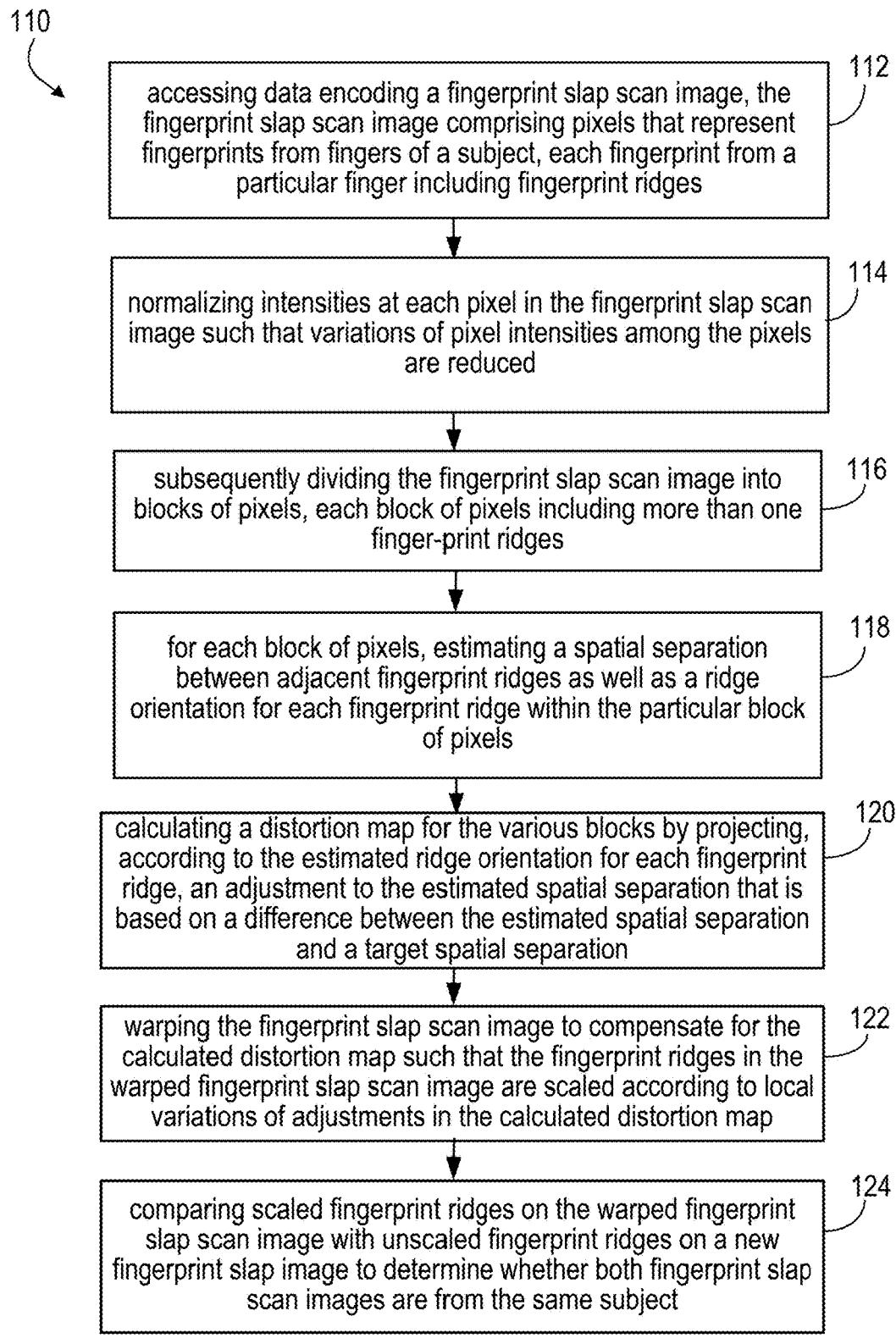
FIG. 1B is a flow chart detailing the above example of processing an input fingerprint slap scan image to generate a normalized output fingerprint slap scan image.
Figure 2A:
FIGS. 2A-2E illustrate various images of a fingerprint during the example of processing according to FIGS. 1A-1B.

FIG. 1B illustrates a flow chart 110 for processing a fingerprint slap scan image. Initially, data encoding a fingerprint slap scan image may be accessed (112). An example of fingerprint slap scan image 102 is fingerprint slap scan image 202 in FIG. 2A. The fingerprint slap scan image may be received from a fingerprint scanner device, or a data storage device. As discussed above, the scanner device may include an optical scanner device, an ultrasonic scanner device, or a capacitive scanner device. The fingerprint slap scan image may be composed of pixels that represent fingerprints from fingers of a subject, each fingerprint from a particular finger print include fingerprint ridges. Such fingerprint ridges possess patterns that may be unique to a particular individual.

Figure 2B:

Next, intensities at each pixel of the fingerprint slap scan image are normalized such that local variations of intensities among the pixels are compensated (114). As discussed above, such local variations tend to depend on image region for a number of reasons during image capturing. An example of the smoothing effect is illustrated by image 204 illustrated in FIG. 2B. Generally, such filtering may sharpen a fingerprint image in a high dynamic log-scale domain and map the sharpened image back to the regular grayscale intensity domain with a user choice of multiple (e.g., four) spatial scales (frequency bands) to avoid noisy outcome that may appear in a sharpened image.

Figure 2C:
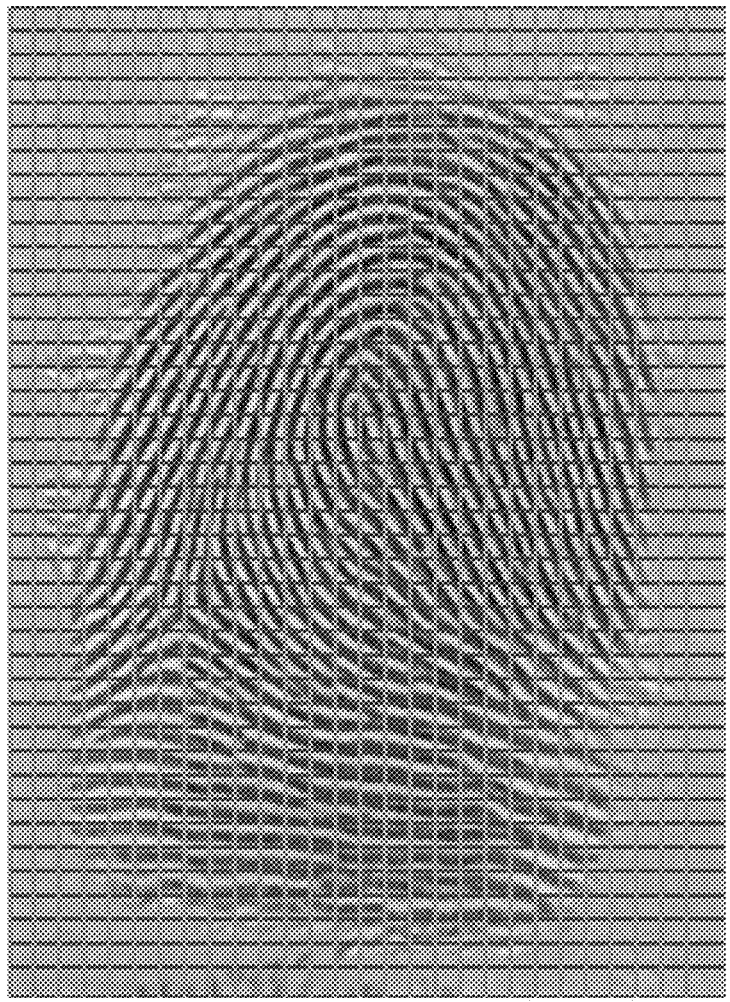

Subsequently, the normalized fingerprint image are divided into blocks of pixels, each block of pixels including more than one fingerprint ridges (116). An example of an intensity-normalized image divided in blocks is shown in FIG. 2C as image 206A. For each block of pixels, an estimation is performed to calculate a spatial separation pattern between adjacent fingerprint ridges as well as a ridge orientation for each fingerprint ridge within the particular block of pixels (118).

Figure 2D:
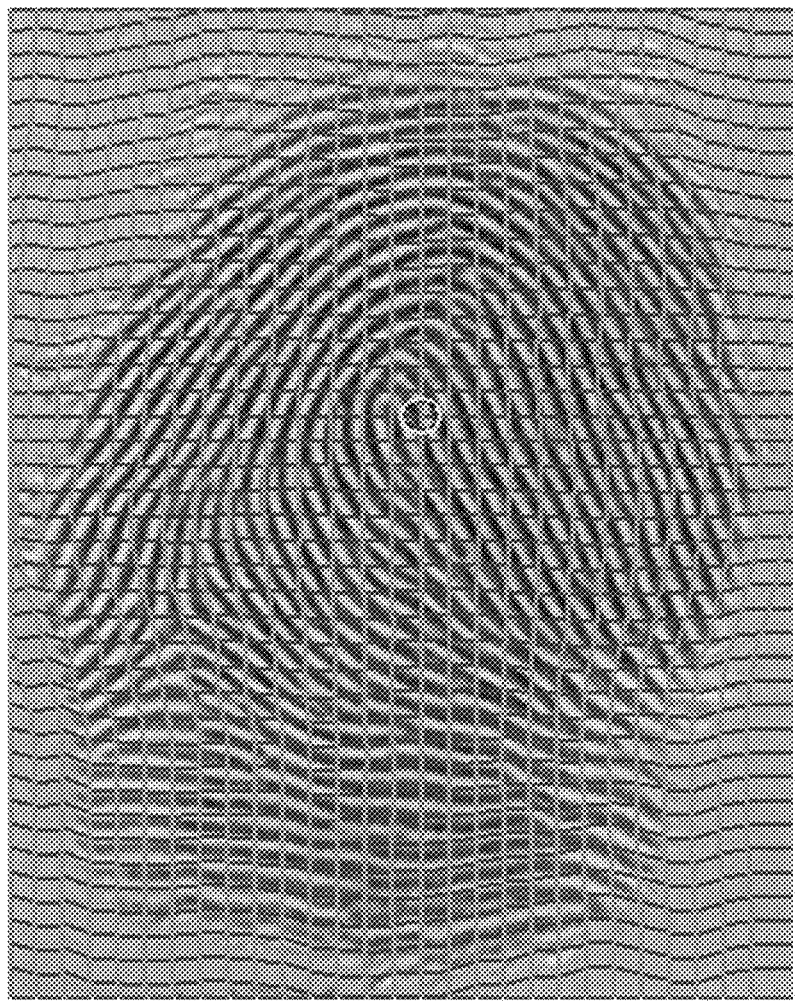

Thereafter, a distortion map is calculated for the various blocks of pixels (120). The calculation may include projecting, according to the estimated ridge orientation for each fingerprint ridge, an adjustment to the estimated spatial separation. The adjustment is based on a difference between the estimated signal separation and a target spatial separation. This target spatial separation can be a global value. It is an average of between-ridge distances, for example, of about 10 pixels on a 500-dpi fingerprint scan (or 20 pixels on a 100-dpi scan. Usually adult male subjects have a wider ridge distance, compared to adult female subjects. Children usually has a ridge distance of around 7 or 8 pixels on a 500-dpi fingerprint. An example of the calculated distortion map is illustrated in FIG. 2D as image 206B.

Figure 2E:

According to the calculated adjustment, the intensity-normalized image may be warped to compensate for the distortion map such that the fingerprint ridges in the warped fingerprint slap scan image are scaled according to local variations of adjustments in the calculated distortion map (122). An example of the warped fingerprint image is image 208 in FIG. 2E.

Lastly, the scaled fingerprint ridges on the warped fingerprint slap scan image can be compare with unscaled fingerprint slap scan image to determine whether both fingerprint slap scan image are from the same individual (124).

Various implementations of systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The use of the digital watermark is stateless. During an implemented method, the personally identifiable information of the user stored or held is not stored for future use. These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method to process fingerprints on a fingerprint slap scan, the method comprising:
   accessing data encoding a fingerprint slap scan image, the fingerprint slap scan image comprising pixels that represent fingerprints from fingers of a subject, each fingerprint from a particular finger including fingerprint ridges;
   normalizing intensities at each pixel in the fingerprint slap scan image such that variations of pixel intensities between fingerprint ridges and valleys are regularized;
   subsequently dividing the fingerprint slap scan image into blocks of pixels, each block of pixels including two or more fingerprint ridges;
   for each block of pixels
      estimating a respective spatial separation between each adjacent fingerprint ridges within the block of pixels and
      estimating a ridge orientation for each fingerprint ridge within the block of pixels;
   calculating a distortion map for the blocks by, for each block of pixels, projecting, according to the ridge orientations for the fingerprint ridges within the block of pixels, an adjustment to the respective spatial separation for each adjacent fingerprint ridges within the block of pixels, wherein the adjustment to the respective spatial separation is based on a difference between the respective spatial separation and a target spatial separation; and
   warping the fingerprint slap scan image to compensate for the calculated distortion map such that fingerprint ridges in the warped fingerprint slap scan image are scaled to compensate for local variations of adjustments in the calculated distortion map,
   wherein warping the fingerprint slap scan image to compensate for the calculated distortion map comprises:
      propagating the projected adjustments in the calculated distortion map for the blocks by integrating the calculated distortion map from a warping center on the fingerprint slap scan image.

2. The computer-implemented method of claim 1, wherein warping the fingerprint slap scan image to compensate for the calculated distortion map further comprises:
   remapping the fingerprint slap scan image onto a new grid that compensates for the calculated distortion map, the new grid being matching the projected adjustments propagated in the calculated distortion map.

3. The computer-implemented method of claim 1, further comprising:
   identifying the warping center as a block that includes a fingerprint ridge with a turning curvature higher than turning curvatures of other fingerprint ridges on the fingerprint slap scan image.

4. The computer-implemented method of claim 1, wherein integrating the calculated distortion map comprises:
   integrating the respective spatial separations from the warping center initially along a first direction and then along a second direction, wherein the second direction is substantially orthogonal to the first direction.

5. The computer-implemented method of claim 1, wherein integrating the calculated distortion map comprises:
   integrating the respective spatial separations from the warping center initially along a direction that is substantially horizontal in the fingerprint slap scan image and then vertically along another direction that is substantially vertical in the fingerprint slap scan image.

6. The computer-implemented method of claim 1, wherein integrating the calculated distortion map comprises:
integrating the respective spatial separations from the warping center initially along a direction that is substantially vertical in the fingerprint slap scan image and then along another direction that is substantially horizontal in the fingerprint slap scan image.

7. The computer-implemented method of claim 1, further comprising:
comparing scaled fingerprint ridges on the warped fingerprint slap scan image with unscaled fingerprint ridges on a new fingerprint slap image to determine whether the fingerprint slap scan image and the new fingerprint slap image are both from the subject.

8. The computer-implemented method of claim 7, wherein the fingerprint slap scan image and the new fingerprint slap scan image were taken more than 1 year apart.

9. The computer-implemented method of claim 1, wherein each block comprises N by N pixels while the pixels of the fingerprint slap scan image are presented on a dots per inch (DPI) grid.

10. The computer-implemented method of claim 9, wherein N is 24 and the DPI grid is 500 dpi.

11. The computer-implemented method of claim 9, wherein each block overlaps with a neighboring block by N/2 pixels.

12. The computer-implemented method of claim 1, further comprising: smoothening noise on the fingerprint slap scan image.

13. The computer-implemented method of claim 12, wherein smoothening noise comprises:
blending a first output from a band-passed Log-Ratio enhancement filtering and a second output from a model-based Short-Time-Fourier-Transform enhancement processing.

14. The computer-implemented method of claim 1, wherein the target spatial separation is identical across the blocks of the fingerprint slap scan image.

15. A computer system, comprising:
at least one processor; and
a non-transitory computer-readable storage medium coupled to the at least one processor and storing programming instructions for execution by the at least one processor, the programming instructions instruct the at least one processor to:
access data encoding a fingerprint slap scan image, the fingerprint slap scan image comprising pixels that represent fingerprints from fingers of a subject, each fingerprint from a particular finger including fingerprint ridges;
normalize intensities at each pixel in the fingerprint slap scan image such that variations of pixel intensities between fingerprint ridges and valleys are regularized;
subsequently divide the fingerprint slap scan image into blocks of pixels, each block of pixels including two or more fingerprint ridges;
for each block of pixels, estimate a respective spatial separation between each adjacent fingerprint ridges within the block of pixels and estimate a ridge orientation for each fingerprint ridge within the block of pixels;
calculate a distortion map for the blocks by, for each block of pixels, projecting, according to the ridge orientations for the fingerprint ridges within the block of pixels, an adjustment to the respective spatial separation for each adjacent fingerprint ridges within the block of pixels, wherein the adjustment to the respective spatial separation is based on a difference between the respective spatial separation and a target spatial separation; and
warp the fingerprint slap scan image to compensate for the calculated distortion map by propagating the projected adjustments in the calculated distortion map for the blocks by integrating the calculated distortion map from a warping center on the fingerprint slap scan image such that fingerprint ridges in the warped fingerprint slap scan image are scaled to compensate for local variations of adjustments in the calculated distortion map.

16. The computer system of claim 15, wherein the programming instructions instruct the at least one processor to warp the distortion map by remapping the fingerprint slap scan image onto a new grid that compensates for the calculated distortion map, the new grid being matching the projected adjustments propagated in the calculated distortion map.

17. The computer system of claim 15, wherein the programming instructions instruct the at least one processor to identify the warping center as a block that includes a fingerprint ridge with a turning curvature higher than turning curvatures of other fingerprint ridges on the fingerprint slap scan image.

18. A non-transitory machine-readable medium, comprising software instructions that, when executed by at least one computer processor, causes the at least one computer processor to:
access data encoding a fingerprint slap scan image, the fingerprint slap scan image comprising pixels that represent fingerprints from fingers of a subject, each fingerprint from a particular finger including fingerprint ridges;
normalize intensities at each pixel in the fingerprint slap scan image such that variations of pixel intensities between fingerprint ridges and valleys are regularized;
subsequently divide the fingerprint slap scan image into blocks of pixels, each block of pixels including two or more fingerprint ridges;
for each block of pixels, estimate a respective spatial separation between each adjacent fingerprint ridges within the block of pixels and estimate a ridge orientation for each fingerprint ridge within the block of pixels;
calculate a distortion map for the blocks by, for each block of pixels, projecting, according to the estimated ridge orientation for each fingerprint ridge within the block of pixels, an adjustment to the respective spatial separation for each adjacent fingerprint ridges, wherein the adjustment to the respective spatial separation is based on a difference between the respective spatial separation and a target spatial separation; and
warp the fingerprint slap scan image to compensate for the calculated distortion map by propagating the projected adjustments in the calculated distortion map for the blocks by integrating the calculated distortion map from a warping center on the fingerprint slap scan image such that fingerprint ridges in the warped fingerprint slap scan image are scaled to compensate for local variations of adjustments in the calculated distortion map.

* * * * *